United States Patent
Imoji et al.

(10) Patent No.: US 8,391,544 B2
(45) Date of Patent: Mar. 5, 2013

(54) IMAGE PROCESSING APPARATUS AND METHOD FOR PROCESSING IMAGE

(75) Inventors: Kousuke Imoji, Akishima (JP); Yuki Kaneko, Inagi (JP); Junichi Takahashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 12/791,779

(22) Filed: Jun. 1, 2010

(65) Prior Publication Data
US 2010/0329505 A1 Dec. 30, 2010

(30) Foreign Application Priority Data
Jun. 30, 2009 (JP) ................. 2009-156273

(51) Int. Cl.
*G10L 13/08* (2006.01)
*G06K 9/00* (2006.01)
(52) U.S. Cl. ................. 382/100; 704/260; 704/E13.011
(58) Field of Classification Search ............ 704/260
See application file for complete search history.

(56) References Cited

U.S. PATENT DOCUMENTS

| | | | | |
|---|---|---|---|---|
| 5,325,462 A | * | 6/1994 | Farrett | 704/258 |
| 2005/0096909 A1 | * | 5/2005 | Bakis et al. | 704/260 |
| 2008/0189766 A1 | * | 8/2008 | Bell et al. | 726/3 |

FOREIGN PATENT DOCUMENTS

| | | | |
|---|---|---|---|
| JP | 2003-317074 | | 11/2003 |
| JP | 2007-122533 | | 5/2007 |
| JP | 2009081785 A | * | 4/2009 |
| JP | 2009253931 A | * | 10/2009 |
| JP | 2010066844 A | * | 3/2010 |
| JP | 2010176224 A | * | 8/2010 |
| WO | WO 0225633 A1 | * | 3/2002 |
| WO | WO 2006-082886 | | 8/2006 |

\* cited by examiner

*Primary Examiner* — Stephen R Koziol
*Assistant Examiner* — Raphael Schwartz
(74) *Attorney, Agent, or Firm* — Knobbe, Martens, Olson & Bear, LLP

(57) ABSTRACT

An image processing apparatus includes: a storage module configured to store a plurality of pieces of comment data; an analyzing module configured to analyze an expression of a person contained in image data; a generating module configured to select a target comment data from among the comment data stored in the storage module based on the expression of the person analyzed by the analyzing module, and to generate voice data using the target comment data; and an output module configured to output reproduction data to be used for displaying the image data together with the voice data generated by the generating module.

4 Claims, 11 Drawing Sheets

1  2  M  N

ANGRY ←→ JOYFUL
-10.0        10.0

SAD ←→ HAPPY
-10.0       10.0

| EXPRESSION NO. | JOY/ANGER LEVEL | SORROW/HAPPINESS LEVEL | SPEECH PRIORITY RANK |
|---|---|---|---|
| 1 | 8.1 | 9.4 | 1 |
| 2 | -4.3 | 6.2 | 2 |
| ... | ... | ... | ... |
| M | -2.9 | 0.4 | 3 |
| ... | ... | ... | ... |
| N | -4.2 | 6.3 | 2 |

RANGE OF SPEECH PRIORITY RANK: 1 (HIGH) TO 10 (LOW)

| EXPRESSION NO. | JOY/ANGER LEVEL | SORROW/HAPPINESS LEVEL | SPEECH PRIORITY RANK | MOST SIMILAR EXPRESSION NO. | SIMILARITY |
|---|---|---|---|---|---|
| 1 | 8.1 | 9.4 | 1 | 3 | 0.3 |
| 2 | -4.3 | 6.2 | 8 | N | 0.98 |
| ... | ... | ... | ... | ... | ... |
| M | -2.9 | 0.4 | 9 | 7 | 0.1 |
| ... | ... | ... | ... | ... | ... |
| N | -4.2 | 6.3 | 8 | 2 | 0.98 |

RANGE OF SPEECH PRIORITY RANK: 1 (HIGH) TO 10 (LOW)
SIMILARITY RANGE: 0.0 (NO SIMILARITY IN EXPRESSION) TO 1.0 (SIMILAR IN EXPRESSION)

FIG. 10

| JOY/ANGER LEVEL | SORROW/HAPPINESS LEVEL | TEMPO | SOUND VOLUME | COMMENT 1 | COMMENT 2 |
|---|---|---|---|---|---|
| -3.0~-1.0 | 0.2~0.6 | 3 | 3 | Mmm, now would be the time. | Does not make sense. |
| 8.0~8.2 | 9.3~10.0 | 8 | 8 | How about this!! | Excellent! |
| ... | ... | ... | ... | ... | ... |
| 8.3~8.4 | 8.9~9.2 | 5 | 9 | Can't you see this? | We did it! |
| 8.1~8.2 | 9.4~9.5 | 9 | 7 | Ta-da! | This is great! |
| -4.5~4.0 | 6.2~6.4 | 4 | 6 | How confident you are! | I'm not convinced. |

JOY/ANGER RANGE: -10 (ANGRY) TO 10 (JOYFUL)
SORROW/HAPPINESS RANGE: -10 (SAD) TO 10 (HAPPY)
TEMPO RANGE: 0 (SLOW) TO 10 (FAST)
SOUND VOLUME RANGE: 0 (SMALL) TO 10 (LARGE)

FIG. 11

| EXPRESSION NO. | JOY/ ANGER LEVEL | SORROW/ HAPPINESS LEVEL | SPEECH PRIORITY RANK | MOST SIMILAR EXPRESSION NO. | SIMILARITY | SELECTED COMMENT |
|---|---|---|---|---|---|---|
| 1 | 8.1 | 9.4 | 1 | 3 | 0.3 | How about this!! |
| 2 | -4.3 | 6.2 | 2 | N | 0.98 | How confident you are! |
| ... | ... | ... | ... | ... | ... | |
| N | -4.2 | 6.3 | 2 | 2 | 0.98 | How confident you are! |

IMAGE PROCESSING APPARATUS AND METHOD FOR PROCESSING IMAGE

CROSS REFERENCE TO RELATED APPLICATION(S)

The present disclosure relates to the subject matters contained in Japanese Patent Application No. 2009-156273 filed on Jun. 30, 2009, which are incorporated herein by reference in its entirety.

FIELD

The present invention relates to an image processing apparatus and a method for processing image to output image data with voice comment data.

BACKGROUND

With the spread of digital cameras, album edit supporting software for editing captured image data into an album and like software have become widely used. For example, album edit supporting software which is installed in a personal computer provides a function that allows the user to produce an album easily by capturing still image data from a digital camera main body or a storage medium such as a memory card, an MO drive, or a photo CD.

Since album edit supporting software manages image data by attaching indices to them as done in a real album, the user can easily open a virtual album through a manipulation using a mouse. Furthermore, the user can arrange image data freely or using a format that is prepared in advance.

There is another type of album edit supporting software having a function of producing an album with voices or tunes by correlating voice files or musical files with image data and playing a slide show with background sound using images of the album.

For example, JP-A-2003-317074 discloses a technique for outputting, as a voice, the comment being displayed in a balloon that is displayed near an image.

However, in the technique disclosed in the publication, JP-A-2003-317074, the comment being displayed in a balloon is merely output as a voice. That is, voice comment data cannot be output automatically at a tempo or a sound volume that corresponds to the expression of a person contained in an image.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 10 shows an example database of comment data which is stored in an HDD of the image processing apparatus according to the embodiment.

FIG. 11 shows table data of sets of selected comment data, a joy/anger level, a sorrow/happiness level, a speech priority rank, a most similar expression number, and similarity for the respective expression numbers in the image processing apparatus according to the embodiment.

DETAILED DESCRIPTION OF THE EMBODIMENTS

Figure 1:
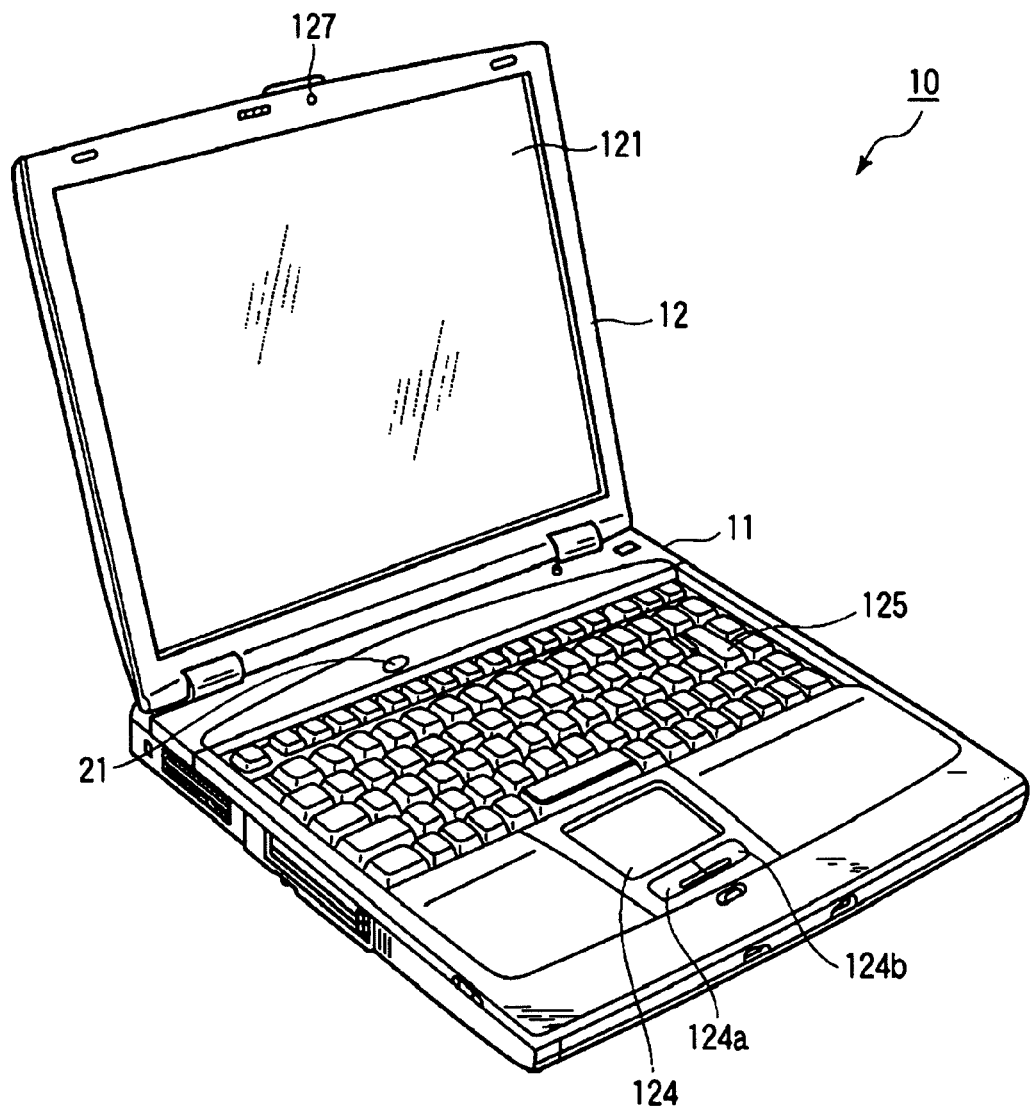
FIG. 1 shows a configuration of an image processing apparatus according to an embodiment of the present invention.

Hereinafter, an embodiment of the invention will be described with reference to the drawings. In the following description, common reference numerals are assigned to common components and elements throughout the drawings.

A configuration of an image processing apparatus according to the embodiment of the invention will be described with reference to FIG. 1. The image processing apparatus according to the embodiment is a notebook personal computer 10. However, the invention is not limited to such a case and can also be applied to such apparatus as a PDA (personal digital assistant) and a home server.

The computer 10 is equipped with a camera 127 as an imaging device. Equipped with an imaging device such as a CCD (charge-coupled device), the camera 127 captures a subject image and stores resulting image data. The embodiment is directed to a case that image data generated by the camera 127 are used. Image data to be used may be data captured externally via a memory card, a cable, an optical disc, a network, or the like, and there are no limitations on the method for acquiring image data. Instead of being incorporated in the computer 10, the camera 127 may be connected, as an external device, to the computer 10.

The computer 10 includes a main unit 11 and a display unit 12. The display unit 12 incorporates a display device which is an LCD (liquid crystal display) 121 having a touch panel function, and the display screen of the LCD 121 is located approximately at the center of the display unit 12.

The display unit 12 is attached to the main unit 11 so as to be rotatable between an opened position and a closed position. The camera 127 is disposed at a top position in the display unit 12. The main unit 11 has a thin, box-shaped body, and its top surface is provided with a keyboard 125, a power button 21 for powering on/off the computer 10, a touch pad 124 having input buttons 124a and 124b nearby, etc.

Next, the system configuration of the computer 10 will be described with reference to FIG. 2.

Figure 2:
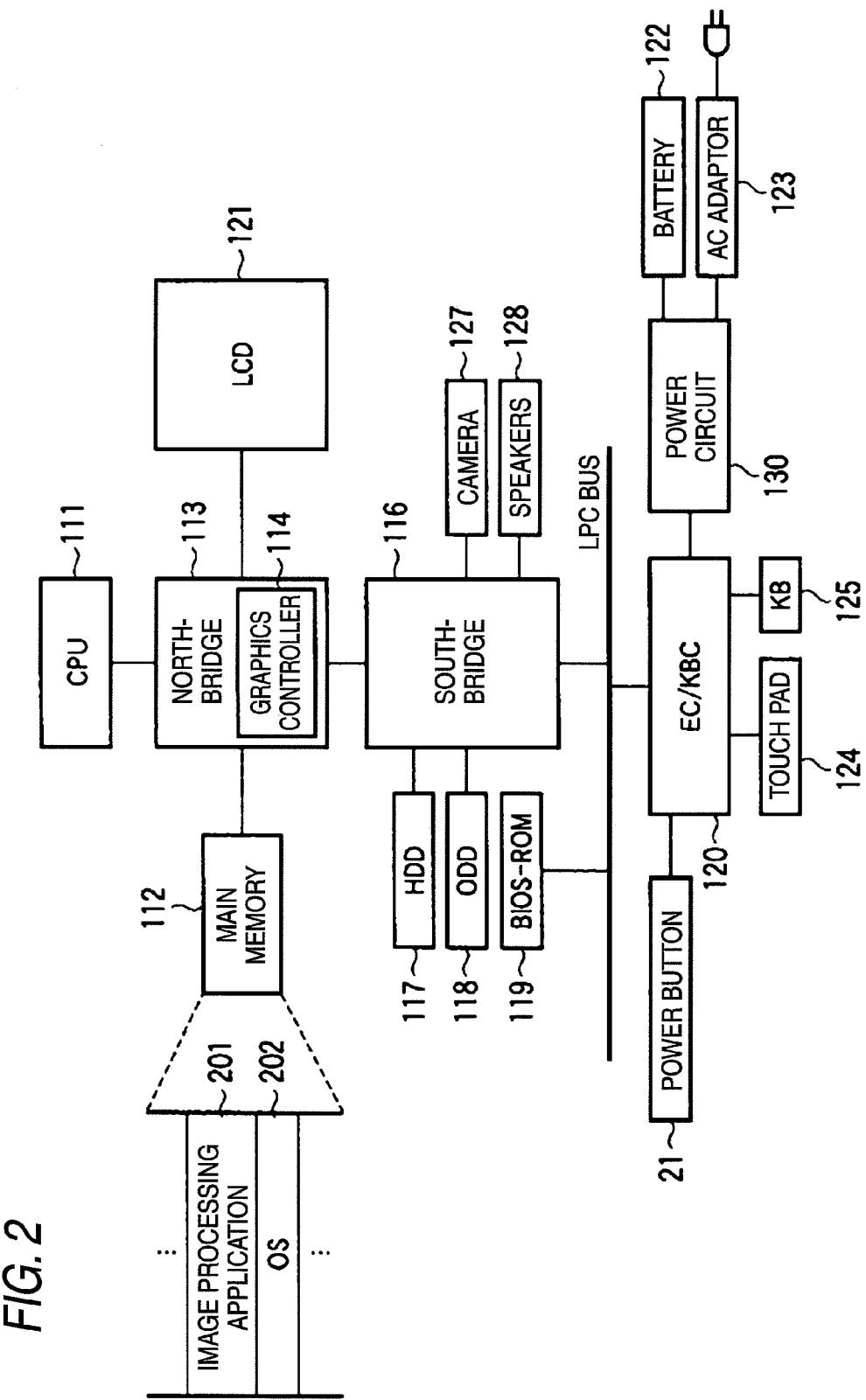
FIG. 2 is a block diagram outlining the system configuration of the image processing apparatus according to the embodiment.

As shown in FIG. 2, the computer 10 is equipped with a CPU 111, a northbridge 113, a graphics controller 114, a main memory 112, the LCD 121, a southbridge 116, a hard disk drive (hereinafter also referred to as "HDD") 117, an optical disc drive (hereinafter also referred to as "ODD") 118, a BIOS-ROM 119, the camera 127, speakers 128, an embedded controller/keyboard controller IC (EC/KBC) 120, the touch pad 124, the keyboard 125, a power circuit 130, a battery 122, and an AC adaptor 123.

The CPU 111 is a processor for controlling the operations of the computer 10 and runs an operating system (OS) 202 and various application programs such as an image processing application program 201 (hereinafter also referred to as "image processing application") which have been loaded into the main memory 112 from the HDD 117. The image processing application program 201 is software which analyzes persons contained in image data, selects proper data from commend data prepared in advance based on expressions, the number, etc. of the persons analyzed, performs processing of generating data of synthesized voices based on the selected comment data, and then performs processing of displaying the image data and reproducing the generated voice data.

The northbridge 113 is a bridge device for connecting a local bus of the CPU 111 and the southbridge 116. The northbridge 113 incorporates a memory controller for access-controlling the main memory 112. The northbridge 113 also incorporates the graphics controller 114.

The graphics controller 114 is a display controller for controlling the LCD 121 which is used as a display monitor of the computer 10. A display signal generated by the graphics controller 114 is supplied to the LCD 121 of the display unit 12.

The southbridge 116 controls various devices connected to an LPC (low pin count) bus. The southbridge 116 incorporates an IDE (integrated drive electronics) controller for controlling the HDD 117 and the ODD 118. The southbridge 116 also has a function of communicating with a sound controller.

The EC/KBC 120 is a one-chip microcomputer in which an embedded controller for power management and a keyboard controller for controlling the keyboard (KB) 125 and the touch pad 124 are integrated together. The EC/KBC 120 also has a function of powering on/off the computer 10 in response to a manipulation of the power button 21 by the user.

The LCD 121 is a display device for reproducing, together with the speakers 128, reproduction data (image data with voice data) generated by the image processing application 201.

Figure 3:
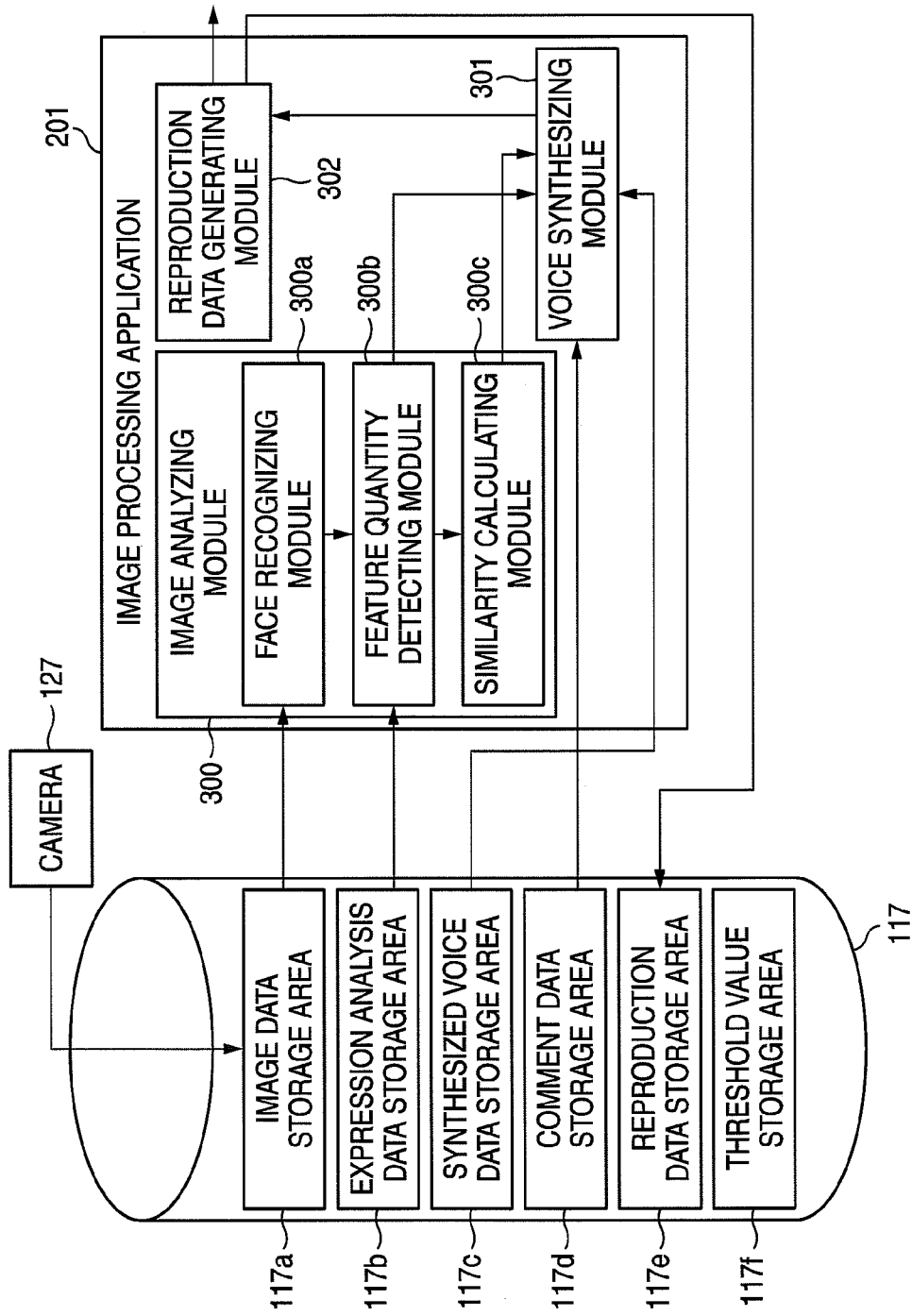
FIG. 3 is a block diagram mainly showing a functional configuration of an image processing application of the image processing apparatus according to the embodiment.

FIG. 3 is a block diagram mainly showing a functional configuration of the image processing application 201.

The image processing application 201 is provided with an image analyzing module 300, a voice synthesizing module 301, and a reproduction data generating module 302. The image analyzing module 300 is provided with a face recognizing module 300a, a feature quantity detecting module 300b, and a similarity calculating module 300c. The HDD 117 has an image data storage area 117a, an expression analysis data storage area 117b, a synthesized voice data storage area 117c, a comment data storage area 117d, reproduction data storage area 117e, and a threshold value storage area 117f.

The image data storage area 117a is a storage area for storing image data generated by the camera 127.

The expression analysis data storage area 117b is a database for analysis of a human expression and is a storage area where, for example, expression analysis data (feature quantities) corresponding to expressions of joy, anger, sorrow, and happiness are stored in advance.

The synthesized voice data storage area 117c is a storage area where synthesized voice data for generation of synthesized voices are stored in advance.

The comment data storage area 117d is a storage area where comment data corresponding to sets of a joy/anger level and a sorrow/happiness level of a person are stored in advance.

The reproduction data storage area 117e is a storage area for storing reproduction data to be generated by the reproduction data generating module 302 (described later).

The threshold value storage area 117f is a storage area for storing similarity threshold values for use of the same speech in the case where plural persons are detected.

The face recognizing module 300a reads image data from the image data storage area 117a where image data generated by the camera 127 are stored, and performs face recognition processing of detecting face regions of persons contained in the image data. That is, the face recognition processing is processing of detecting face regions of persons contained in image data and recognizes them as faces of those persons. In the face recognition processing, the face recognizing module 300a also detects the number of persons contained in the image data. Pieces of information of the detected face regions and number of persons are supplied to the feature quantity detecting module 300b.

The feature quantity detecting module 300b detects feature quantities (expression etc.) of the face region of each person using the received information of the face region detected by the face recognizing module 300a. One technique for detecting a feature quantity of a face region is to detect feature points of a face contained in image data and estimating the degree of smiling of the person based on the detected feature points (refer to JP-A-2005-31566). In detecting feature quantities of a face region, the feature quantity detecting module 300b reads the pre-stored expression analysis data from the expression analysis data storage area 117b and detects a joy/anger level, a sorrow/happiness level of the person by referring to the read-out expression analysis data. The detected joy/anger level, sorrow/happiness level, etc. are supplied to the similarity calculating module 300c and the voice synthesizing module 301. The feature quantity detecting module 300b also supplies, to the similarity calculating module 300c, the information of the number of persons which was received from the face recognizing module 300a.

The similarity calculating module 300c checks the information of the number of persons which is received via the feature quantity detecting module 300b and, if the number of persons is plural, calculates similarity of each person based on the similarity threshold values stored in the threshold value storage area 117f. For example, the similarity calculating module 300c performs processing of detecting, among the persons detected by the face recognizing module 300a, persons whose values of the joy/anger level, sorrow/happiness level, etc. are close to each other and giving each such person a similarity value which is larger when the values are closer to each other. A method for setting values of the joy/anger level, sorrow/happiness level, etc. will be described later. Similarity values calculated by the similarity calculating module 300c are supplied to the voice synthesizing module 301.

The voice synthesizing module 301 determines priority order (hereinafter also referred to as "speech priority order") based on the joy/anger levels and the sorrow/happiness levels of the persons detected by the feature quantity detecting module 300b. The speech priority order is information indicating reproduction order of generated voice data and is determined based on the magnitudes of the values of the joy/anger levels and the sorrow/happiness levels. The voice synthesizing module 301 reads, from the comment data storage area 117d, comment data corresponding to the joy/anger levels and the sorrow/happiness levels of the persons detected by the feature quantity detecting module 300b. Furthermore, the voice synthesizing module 301 reads the synthesized voice data from the synthesized voice data storage area 117c and generates voice data. If plural persons were detected by the face recognizing module 300a, the voice synthesizing module 301 generates individual voice data using different tones for the respective persons so as to allow the user to recognize that there are plural persons.

If the similarity calculating module 300c determines that similarity values are larger than or equal to a threshold value, the voice synthesizing module 301 generates voice data using the same comment data. Also in this case, the voice synthesizing module 301 generates individual voice data using different tones for the respective persons so as to allow the user to recognize that there are plural persons. The voice synthesizing module 301 supplies the generated voice data and the priority information to the reproduction data generating module 302. A similarity calculation method will be described later.

Based on the voice data supplied from the voice synthesizing module 301, the reproduction data generating module 302 generates reproduction data to be used for reproducing the voice data as voices. The reproduction data is reproduced in such a manner that the voice data are reproduced as voices in synchronism with display of the image data based on which the voice data were generated. When voice data of plural persons are to be reproduced, the reproduction data generating module 302 generates reproduction data so that the voice data will be reproduced in order, based on the priority information supplied from the voice synthesizing module 301. The generated reproduction data is output from the reproduction data generating module 302 to the HDD 177 and stored in the reproduction data storage area 117e. The image processing application 201 reads the stored reproduction data from the reproduction data storage area 117e in response to a reproduction request for requesting reproduction of the reproduction data, and causes the LCD 121 and the speakers 128 to reproduce the read-out reproduction data. It is also possible to cause the LCD 121 and the speakers 128 to reproduce the reproduction data generated by the reproduction data generating module 302 without storing it in the HDD 117.

Figure 4:
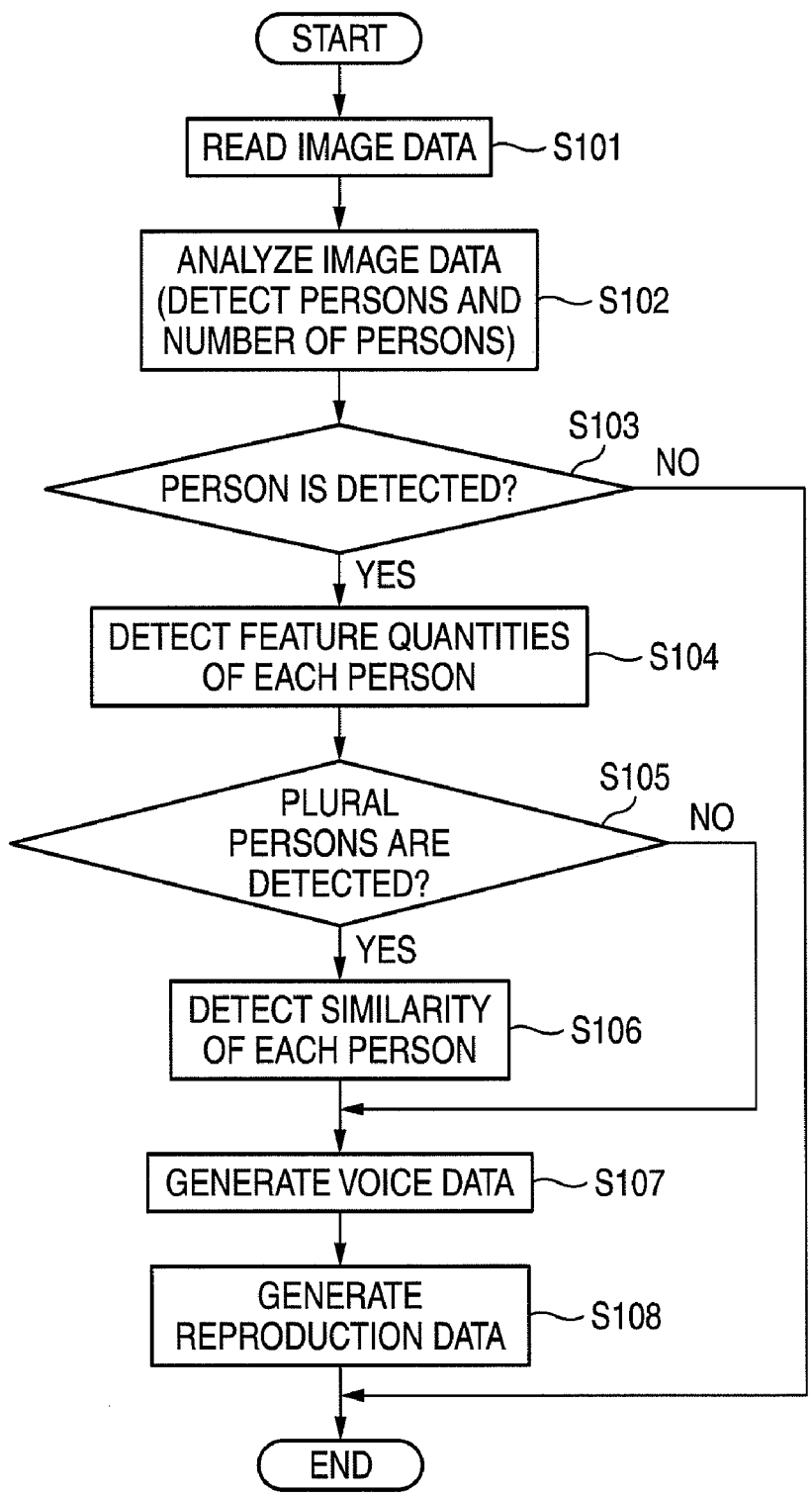
FIG. 4 is a flowchart showing an image processing method of the image processing apparatus according to the embodiment.

FIG. 4 is a flowchart showing an image processing method of the image processing apparatus according to the embodiment of the invention.

The CPU 111 of the computer 10 activates the image processing application 201 stored in the HDD 117, for example, and loads it into the main memory 112. At step S101, according to the image processing application 201 the CPU 111 reads image data from the image data storage area 117a of the HDD 117. At step S102, the CPU 111 analyzes the read-out image data (i.e., detects persons and the number of persons). At step S103, the CPU 111 determines whether or not a person was detected at step S102. If determined that a person was detected at step S102 (S103: yes), at step S104 the CPU 111 detects feature quantities (expression) of the face region of each person. This is done by detecting a joy/anger level, a sorrow/happiness level, etc. of each person by reading and referring to the expression analysis data. Also at step S104, the CPU 111 sets speech priority order (mentioned above) based on the detected joy/anger levels and sorrow/happiness levels of the persons. On the other hand, if the CPU 111 determines that no person was detected (S103: no), the process is finished.

At step S105, the CPU 111 determines, based on the information of the number of persons, whether or not plural persons were detected at step S102. If determined that plural persons were detected at step S102 (S105: yes), the CPU 111 detects similarity values of the respective persons based on the detected joy/anger levels and sorrow/happiness levels of the persons. On the other hand, if the CPU 111 determines that only one person was detected at step S102 (S105: no), a transition is made to step S107.

At step S107, the CPU 111 generates voice data. This is done by selecting proper comment data based on the detected joy/anger levels and sorrow/happiness levels, the speech priority order, and the similarity values and generating voice data using the selected comment data (described later).

At step S108, the CPU 111 generates reproduction data. Reproduction data is data in which image data based on which voice data was generated and the voice data to be reproduced when the image data is displayed are correlated with each other so as to be reproducible. When there are plural voice data, speech priority information (priority order of reproduction of the voice data), pieces of tempo information, and pieces of sound volume information are also correlated with the above data. The CPU 111 stores the generated reproduction data in the reproduction data storage area 117e of the HDD 117, for example.

Next, a specific example of the above-described process will be described.

Figure 5:
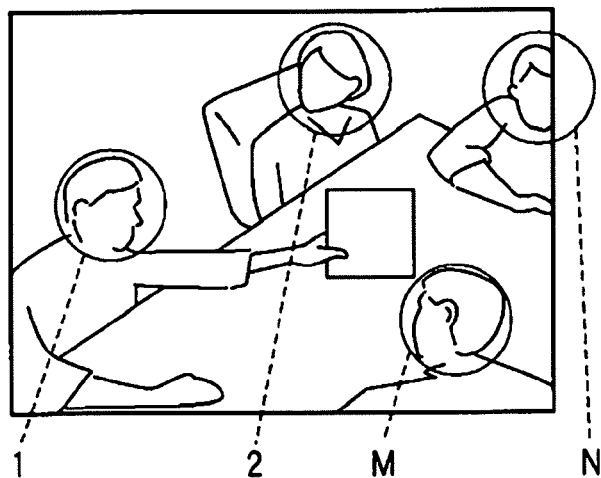
FIG. 5 schematically shows example image data to be read by an image processing application of the image processing apparatus according to the embodiment.

For example, according to the image processing application 201, the CPU 111 reads image data shown in FIG. 5 from the image data storage area 117a of the HDD 117. Then, the CPU 111 analyzes the read-out image data. That is, the CPU 111 detects persons contained in the image data and the number of persons in a manner shown in FIG. 5. For example, four persons contained in the image data are detected and assigned numbers 1, 2, M and N (hereinafter also referred to as "expression numbers"). Since it is determined that a person has been detected, the CPU 111 detects feature quantities of each of persons 1, 2, M, and N.

Figure 6:
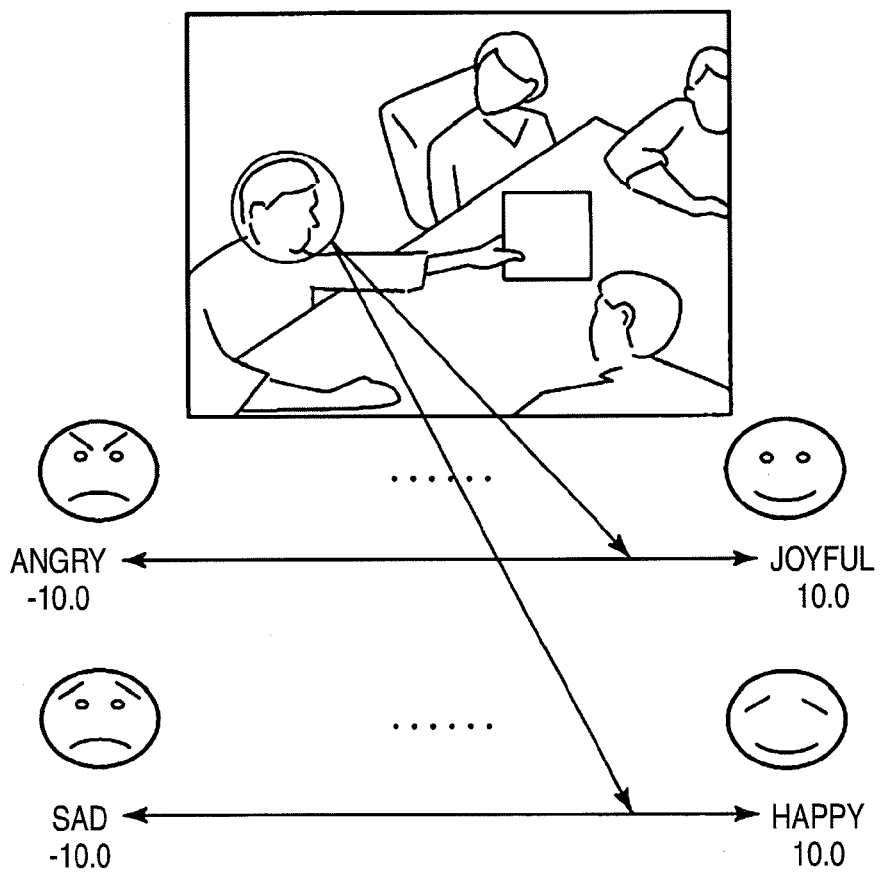
FIG. 6 schematically shows a method for setting a joy/anger level and a sorrow/happiness level in the image processing apparatus according to the embodiment.

FIG. 6 schematically shows a method for setting a joy/anger level and a sorrow/happiness level. For example, as shown in FIG. 6, each of a joy/anger level and a sorrow/happiness level is given a value in a range of −10.0 to 10.0. A value 10.0 is given to an expression that is set as being highest in the joy/anger level or the sorrow/happiness level, and a value −10.0 is given to an expression that is set as being lowest in the joy/anger level or the sorrow/happiness level. The range between the highest joy/anger level or sorrow/happiness level (10.0) and the lowest joy/anger level or sorrow/happiness level (−10.0) is divided equally into 100 sections to produce intermediate levels. A numerical version of the data shown in FIG. 6 is stored in the expression analysis data storage area 117b of HDD 117.

Figure 7:
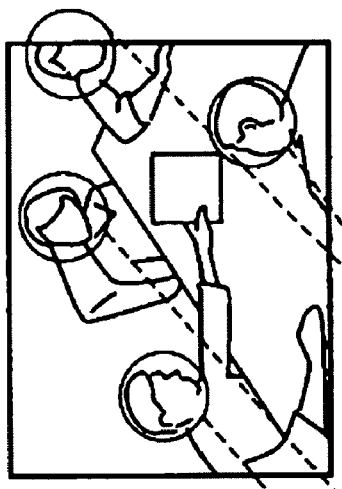
FIG. 7 schematically shows an example in which values of the joy/anger level and the sorrow/happiness level are assigned to each of expression numbers of persons based on detected feature quantities in the image processing apparatus according to the embodiment.

FIG. 7 schematically shows an example in which values of the joy/anger level and the sorrow/happiness level are assigned to each of expression numbers 1, 2, M, and, N based on detected feature quantities of the persons. For example, as shown in FIG. 7, expression number 1 is assigned a joy/anger level "8.1" and a sorrow/happiness level "9.4."

After values of the joy/anger levels and the sorrow/happiness levels have been assigned to the respective expression numbers, speech priority order is set in the processing of detecting feature quantities. As shown in FIG. 7, the expression numbers are given priority rank numbers "1," "2," in descending order of the values of the joy/anger level and the sorrow/happiness level. For example, a speech priority rank "1" is set for the person having expression number 1 who is assigned largest values of the joy/anger level and the sorrow/happiness level.

If determined that plural persons were detected, the CPU 111 detects similarity of each person. As the similarity is closer to "1," it means that expressions of the persons involved are more similar to each other. Similarity is detected by referring to values of the joy/anger level and the sorrow/happiness level of the persons involved. A similarity value of an expression number of attention is determined in a range of 0.0 to 1.0 by comparing the values of the joy/anger level and the sorrow/happiness level of the expression number of attention with closest ones among the values of the joy/anger levels and the sorrow/happiness levels of the other expression numbers. For example, to make comparison between expression numbers 2 and N, a smaller value is divided by a larger value for each of the joy/anger level and the sorrow/happiness level and resulting quotients are averaged.

For joy/anger level: −4.2/−4.3=0.98
For sorrow/happiness level: 6.2/6.3=0.98
Average: 0.98

Accordingly, similarity is determined as "0.98." The CPU 111 determines a highest-similarity pair of expression numbers based on calculated similarity values.

Figure 8:
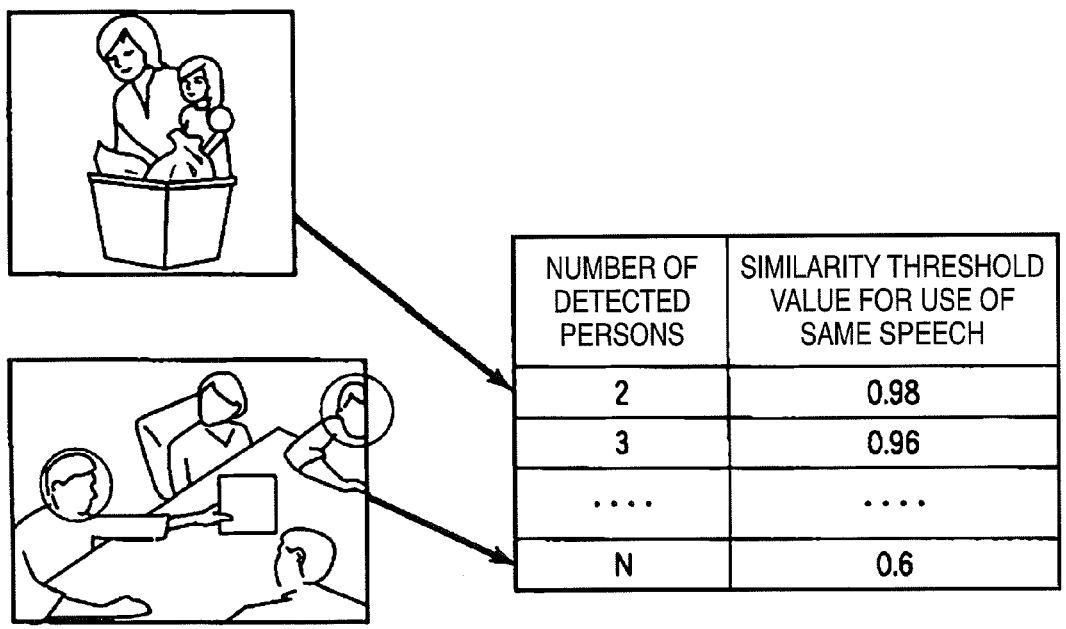
FIG. 8 shows table data of similarity threshold values to be used for determining whether to use the same comment data in the image processing apparatus according to the embodiment.

FIG. 8 shows table data of similarity threshold values to be used for determining whether to use the same speech in the case where plural persons were detected. The data of FIG. 8 are stored in the threshold value storage area 117f of the HDD 117. For example, as shown in FIG. 8, in a case that two persons were detected by the CPU 111 and the similarity is 0.98, in which case the threshold value is 0.98, the CPU 111 uses the same comment data for generating voice data of the two detected persons.

Figure 9:
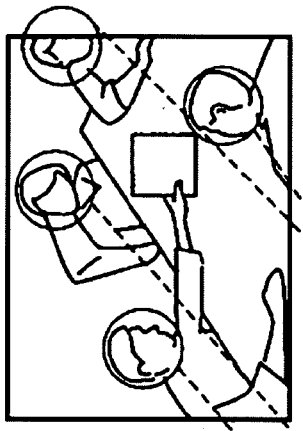
FIG. 9 shows table data in which a joy/anger level, a sorrow/happiness level, a speech priority rank, a most similar expression number, and similarity are correlated with each expression number in the image processing apparatus according to the embodiment.

FIG. 9 shows table data in which a joy/anger level, a sorrow/happiness level, a speech priority rank, a most similar expression number, and similarity are correlated with each expression number. For example, the similarity between expression numbers 2 and N is calculated as 0.98 by the CPU 111 in the above-described manner based on their joy/anger levels and sorrow/happiness levels. In this manner, the CPU 111 calculates similarity for every expression number. In this manner, the CPU 111 can determine that expression numbers 2 and N are a highest-similarity pair of expression numbers (their similarity values are closest to 1).

FIG. 10 shows an example database of comment data etc. The data of FIG. 10 are stored in the comment data storage area 117d of the HDD 117. The CPU 111 selects comment data in the following manner based on values of the joy/anger level and the sorrow/happiness level. For example, expression number 1 corresponds to the second set of ranges (from the top) in the table data of FIG. 10 because its joy/anger level and the sorrow/happiness level are 8.1 and 9.4, respectively. Comment data for expression number 1 are thus "Comment 1: How about this!!" and "Comment 2: Excellent!" When there are plural comment data as in this example, the CPU 111 selects one of them randomly. For example, the CPU 111 selects "Comment 1: How about this!!"

FIG. 11 shows table data of sets of selected comment data, a joy/anger level, a sorrow/happiness level, a speech priority rank, a most similar expression number, and similarity for the respective expression numbers. Likewise, expression number 2 corresponds to the last set of ranges (from the top) in the table data of FIG. 10 because its joy/anger level and sorrow/happiness level are −4.3 and 6.2, respectively. Comment data for expression number 2 are thus "Comment 1: How confident you are!" and "Comment 2: I'm not convinced." Through random selection, the CPU 111 selects, for example, "Comment 1: How confident you are!" as shown in FIG. 11. Since the similarity value of expression number N is larger than the threshold value (see FIG. 8), for expression number N the CPU 111 selects the same comment data as for expression 2 as shown in FIG. 11. The CPU 111 sets the same speech priority rank (e.g., "2") for expression numbers 2 and N.

Then, the CPU 111 generates voice data based on the comment data that were selected in the above-described manner. For example, since the same comment data is selected for expression numbers 2 and N, the CPU 111 generates two voice data of different tones based on "Comment 1: How confident you are!" Since the tempo is "4" as shown in FIG. 10, the CPU 111 generates the voice data so that they will be reproduced at a fourth-level speed among preset 10 speed levels. Since the sound volume is "6," the CPU 111 generates the voice data so that they will be reproduced at a sixth-level volume among preset 10 volume levels. For expression number 1, the CPU 111 generates (synthesizes) voice data using "Comment 1: How about this!!" Since the tempo of expression number 1 is "8" as shown in FIG. 10, the CPU 111 generates the voice data so that it will be reproduced at an eighth-level speed among the preset 10 speed levels. Since the sound volume is "8," the CPU 111 generates the voice data so that it will be reproduced at an eighth-level volume among the preset 10 volume levels.

Reproduction data is data in which image data based on which voice data has been generated and the voice data to be reproduced when the image data is displayed are correlated with each other so as to be reproducible. When there are plural voice data, speech priority information (priority ranks of reproduction of the voice data), pieces of tempo information, and pieces of sound volume information are also correlated with the above data. For example, for expression numbers 2 and N, since their speech priority ranks are "2," reproduction data is generated in such a manner that their voice data are output second in different tones.

Figure 12:
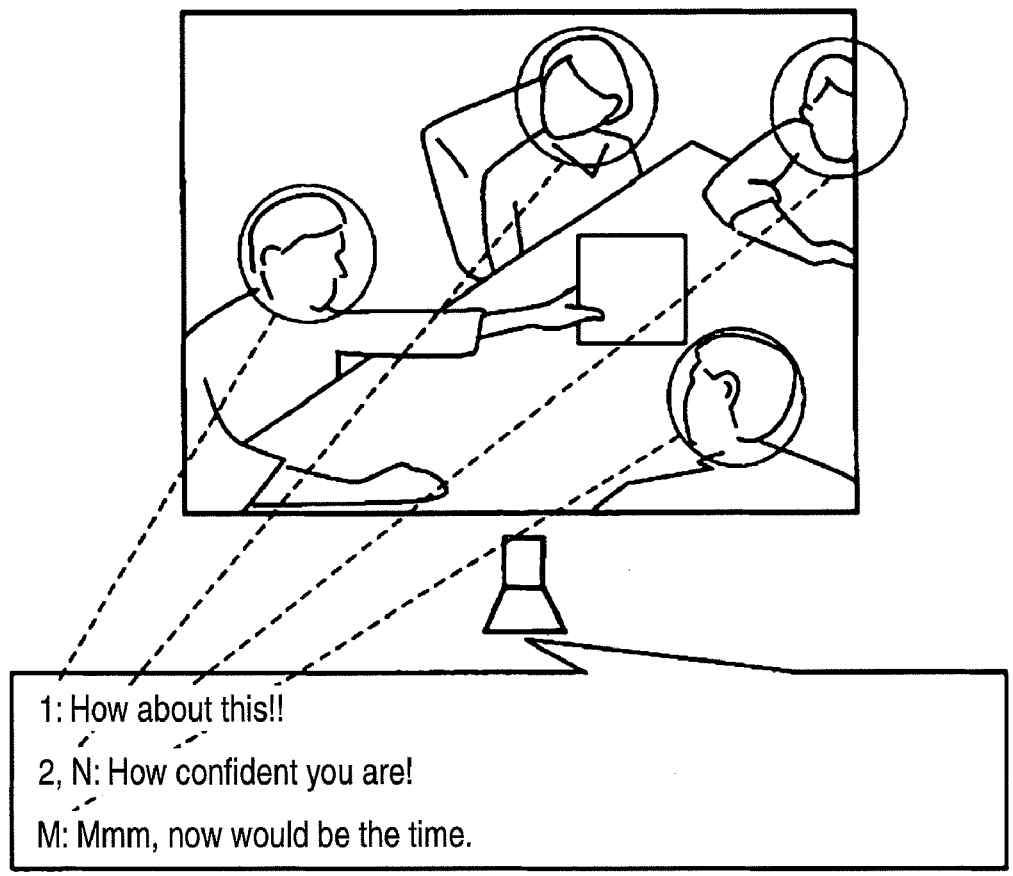
FIG. 12 schematically shows how an LCD and speakers reproduce reproduction data in the image processing apparatus according to the embodiment.

FIG. 12 schematically shows how the LCD 121 and the speakers 128 reproduce the generated reproduction data. When receiving a request for reproducing the reproduction data, the CPU 111 causes the LCD 121 to display the image data and causes the speakers 128 to output the voice data sequentially according to the speech priority order. For example, the voice data "How about this!!" of expression number 1 having the speech priority rank "1" is reproduced first (tempo: 8, sound volume: 8). Then, the voice data "How confident you are!" of expression numbers 2 and N having the speech priority rank "2" are reproduced simultaneously in two tones (tempo: 4, sound volume: 6). For example, in a joyful situation, voice data can be reproduced at a large volume and a relatively fast tempo. In a sad situation, voice data can be reproduced at a small volume and a slow tempo.

Plural images can be reproduced with voice data by the CPU 111's causing sequential reproduction of reproduction data which are generated in the above-described manner. The user can view those images as a slide show. Furthermore, the invention can also be applied to a digital photoframe or an auto collage. The digital photoframe is a device formed in a shape of a photo stand and has a function of storing image data and displaying the stored image data on a built-in display monitor. Equipped with speakers, the digital photoframe can generate and reproduce reproduction data in the same manner as in the embodiment. The auto collage is an image presenting method such as a slide show in which images are displayed sequentially or a method of displaying a photo montage which is an image as a combination of plural images. As such, the invention is not limited to the case of displaying only one image data each time and encompasses a case of displaying plural image data simultaneously.

Furthermore, although in the embodiment, voice data is generated using comment data that is prepared in advance, the invention is not limited to such a case. Voice data that was recorded when image data was generated by shooting can be used. Still further, instead of only outputting voice data as a voice, the voice data may also be displayed as a text in a balloon.

As described above, the embodiment makes it possible to automatically output voice comment data at a tempo and a sound volume that correspond to an expression of a person contained in image data. The viewer can thus view the image data while feeling as if he or she were there.

The image processing apparatus according to the invention can be implemented not only as a computer but also as various consumer image processing apparatus such as a PDA (personal digital assistant). Furthermore, the functions of the image processing application 201 can be implemented by hardware such as a DSP or a microcomputer.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    memory configured to store a plurality of comment data;
    a processor configured to analyze an expression of a person in image data, to select a target comment data from among the comment data in the memory based on the expression of the person analyzed by the processor, and to generate voice data using the target comment data; and
    a display configured to output reproduction data for displaying the image data together with the generated voice data;
    wherein the processor is configured to determine a number of persons in the image data and similarity values of expressions of the persons, and to select the same comment data in the memory and to generate voice data having different tones for the respective persons using the selected same comment data when the similarity values larger than a threshold are determined for a plurality of person.

2. The apparatus of claim 1,
    wherein the memory is configured to additionally store tempo information indicating tempo for reproducing the voice data and sound volume information indicating sound volumes for reproducing the voice data, and
    wherein the processor is configured to select target tempo information and target sound volume information corresponding to the selected target comment data from among the data in the memory based on the expression of the person analyzed by the processor, and to generate voice data using the target tempo information and the target sound volume information.

3. The apparatus of claim 1,
    wherein the processor is configured to determine priority ranks for comment data for the respective persons based on expressions of the respective persons and to generate voice data according to the determined priority ranks, when a plurality of persons are in the image.

4. The apparatus of claim 1,
    wherein the display is configured to display a slide show by outputting reproduction data of plural image data.

* * * * *